Nov. 8, 1938.   R. H. LAWSON ET AL   2,135,756
YARN FEEDING MEANS FOR KNITTING MACHINES
Filed April 8, 1936   8 Sheets-Sheet 1

INVENTORS:
ROBERT H. LAWSON,
ISAAC H. C. GREEN,
WILLIAM L. SMITH JR,
By Roy F. Lovell,
ATT'Y.

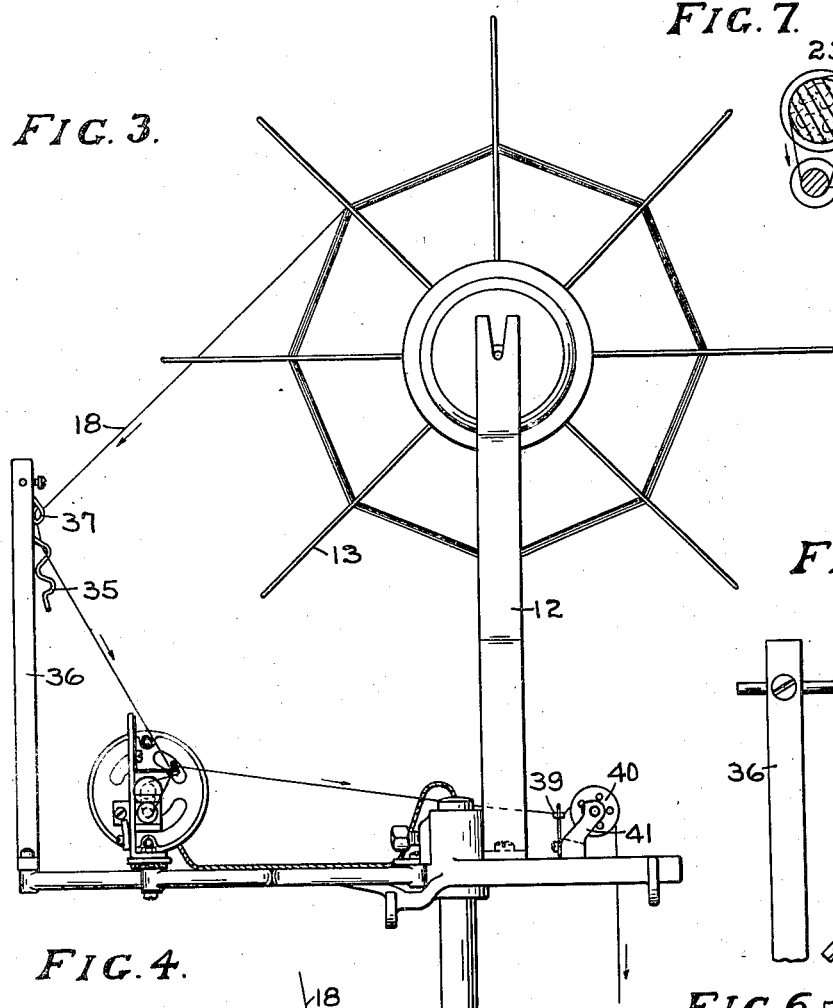
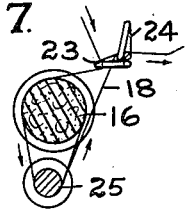
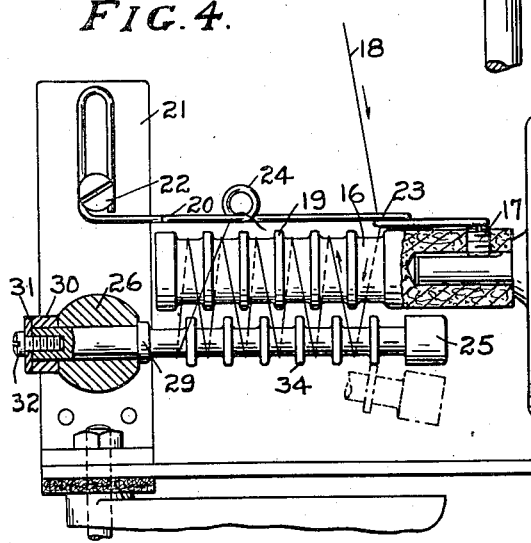
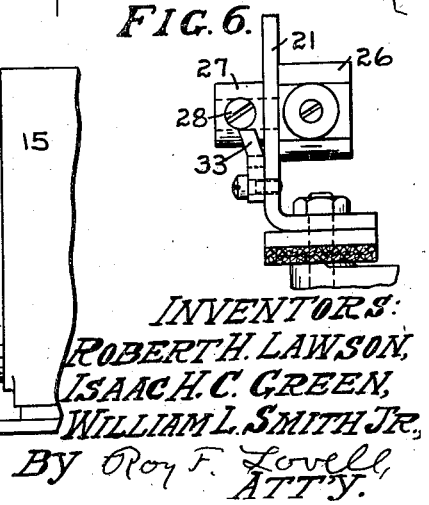

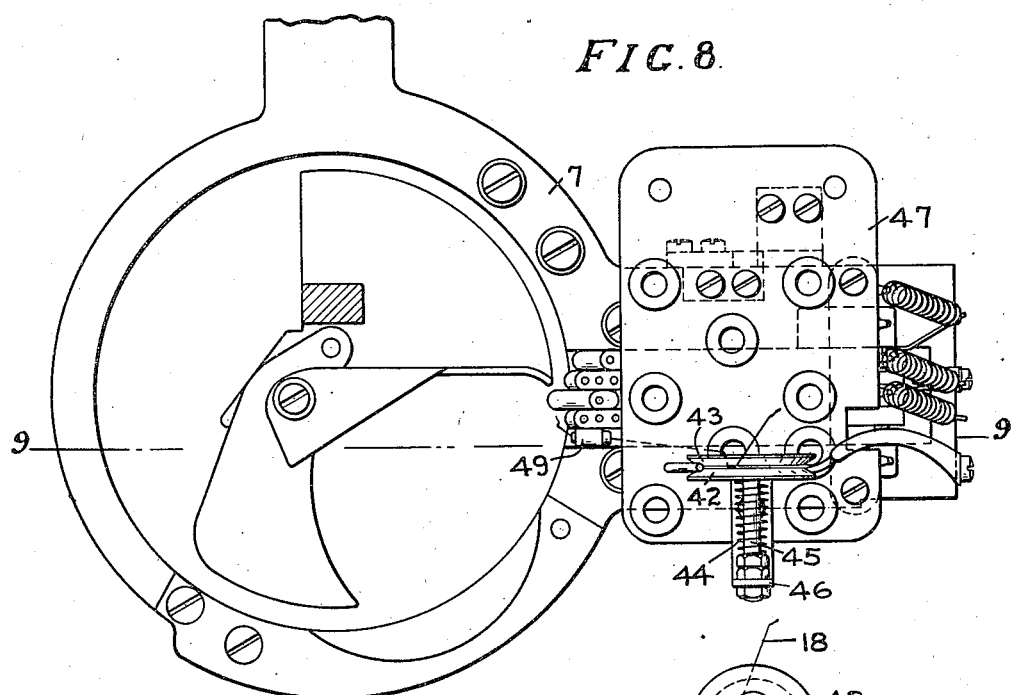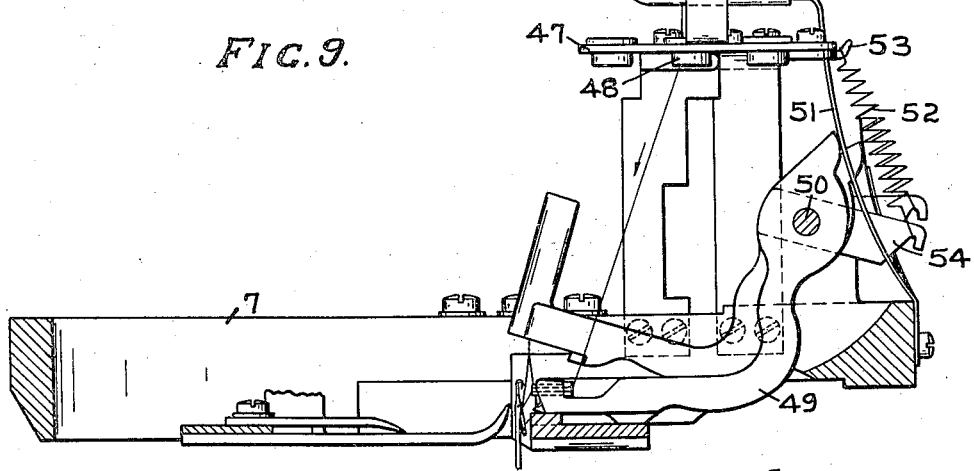

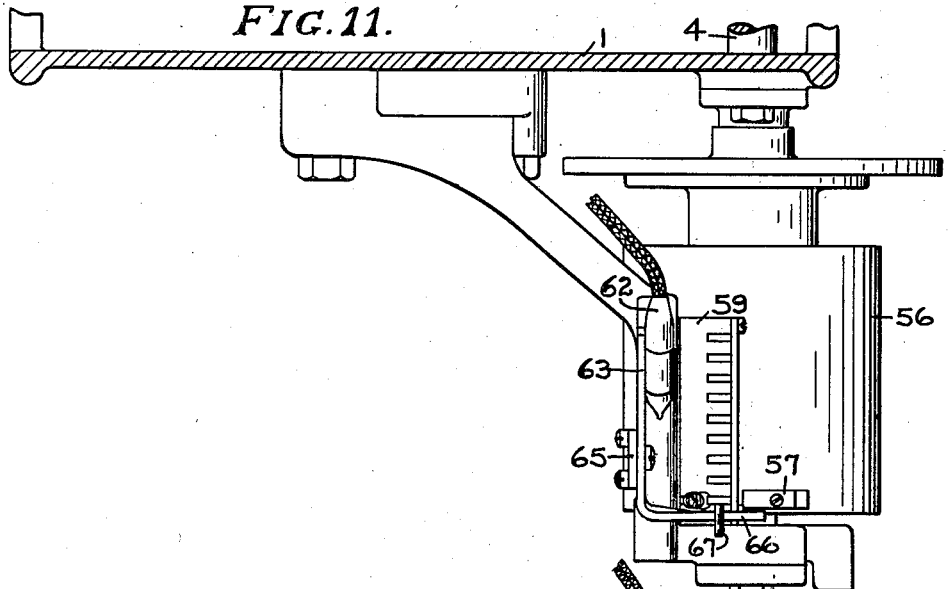
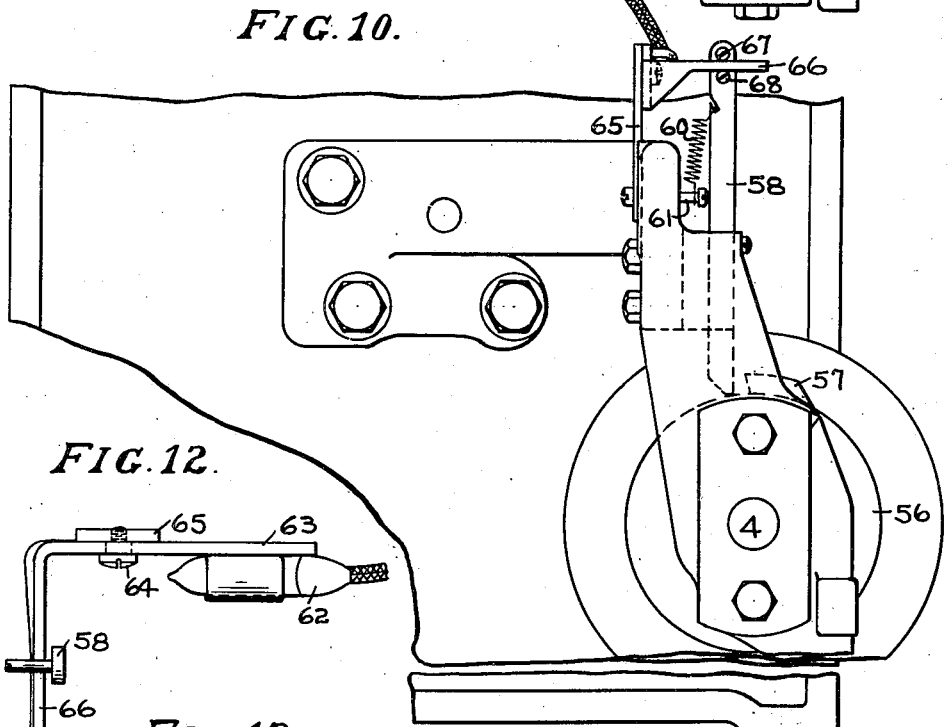
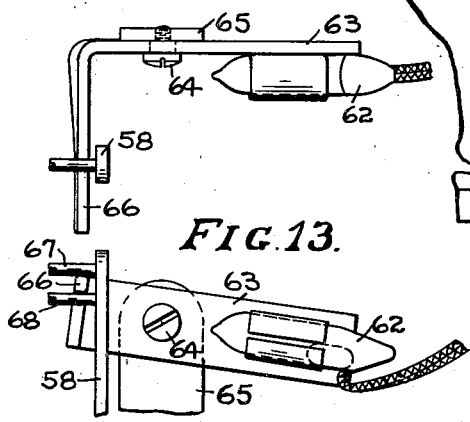

Nov. 8, 1938.   R. H. LAWSON ET AL   2,135,756
YARN FEEDING MEANS FOR KNITTING MACHINES
Filed April 8, 1936   8 Sheets-Sheet 6

INVENTORS:
ROBERT H. LAWSON,
ISAAC H. C. GREEN,
WILLIAM L. SMITH JR.
BY Roy F. Lovell
ATT'Y.

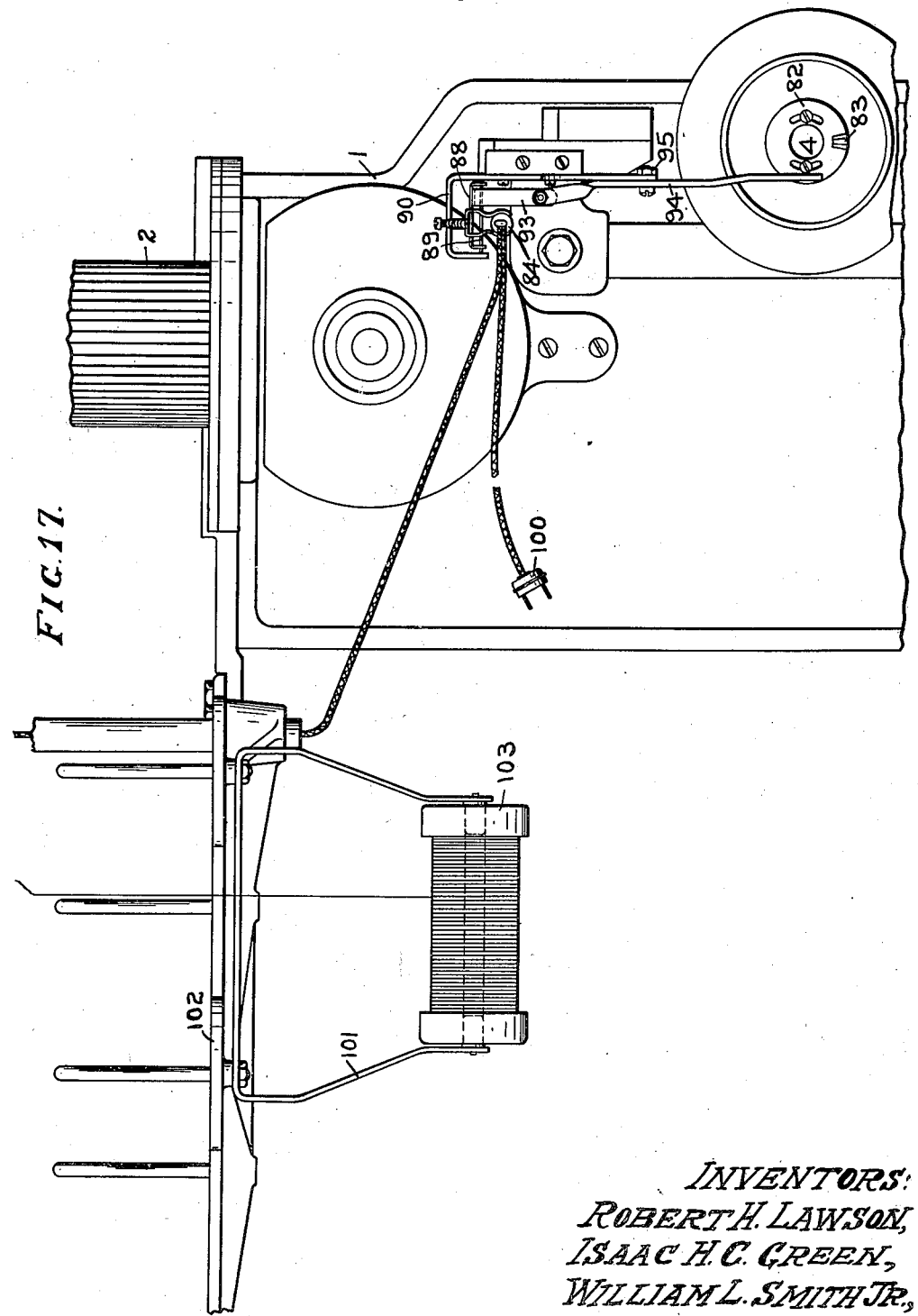

Nov. 8, 1938.    R. H. LAWSON ET AL    2,135,756
YARN FEEDING MEANS FOR KNITTING MACHINES
Filed April 8, 1936    8 Sheets-Sheet 8
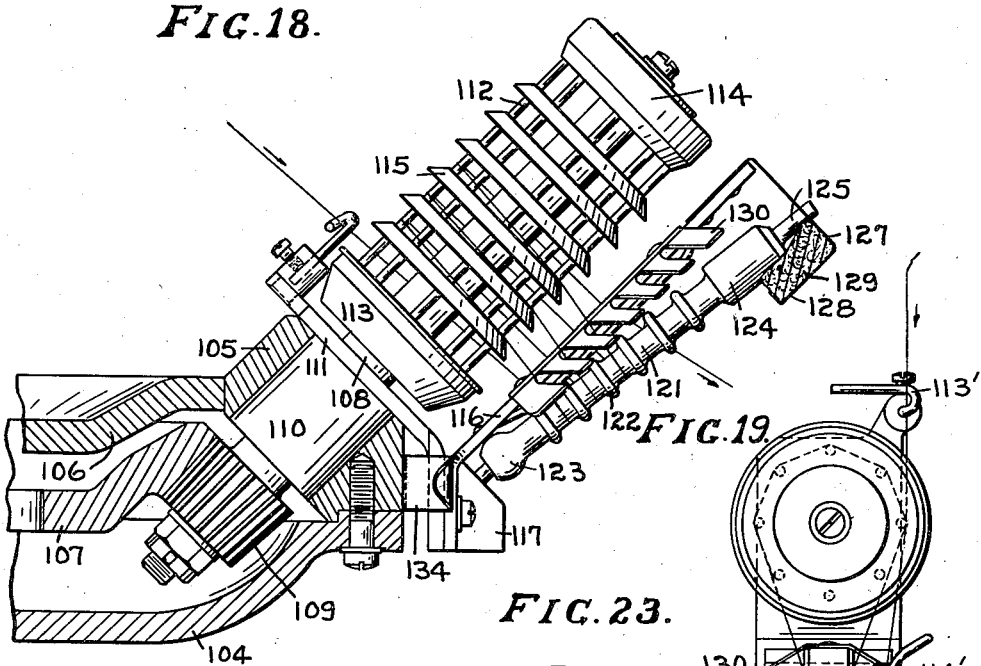
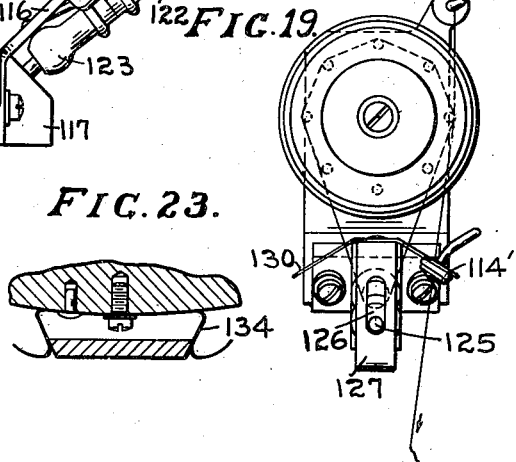
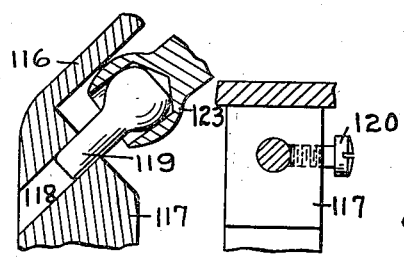
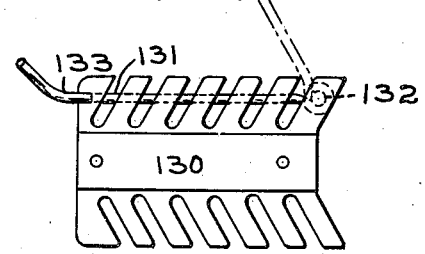
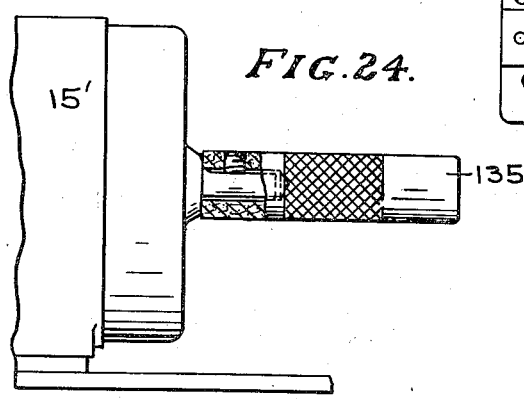
INVENTORS:
ROBERT H. LAWSON,
ISAAC H. C. GREEN,
WILLIAM L. SMITH JR.
By Roy F. Lovell
ATT'Y.

Patented Nov. 8, 1938

2,135,756

UNITED STATES PATENT OFFICE 2,135,756

YARN FEEDING MEANS FOR KNITTING MACHINES

Robert H. Lawson, Pawtucket, Isaac H. C. Green, Central Falls, and William L. Smith, Jr., Pawtucket, R. I., assignors to Hemphill Company, Central Falls, R. I., a corporation of Massachusetts Application April 8, 1936, Serial No. 73,326
In Canada October 11, 1935

14 Claims. (Cl. 66—132)

This case deals with means for feeding rubber or like yarns to the needles of knitting machines, more especially where this yarn is to be fed intermittently. The rubber yarn may be covered or uncovered and may eventually be laid in the fabric or actually knitted on some or all of the needles. It is a purpose of the invention to draw this rubber yarn from a supply and to present it to the needles in amounts desired and at the same time to maintain a uniform tension which will be as light as possible under the circumstances.

In the figures of drawings:

Fig. 3 is a side view illustrating the supply and feeding means shown at the top of Fig. 1 and Fig. 2.

Fig. 4 is a detail, partly in section, illustrating the preferred form of yarn furnishing or feeding mechanism as applied to hosiery machines.

Fig. 5 shows in detail a yarn guide and tension which have been applied to the rubber yarn as it is drawn from a supply.

Fig. 6 shows in detail one portion of the furnishing device illustrated in Figs. 3 and 4.

Fig. 7 is a section of the furnishing device, said section being taken through the feeding roller.

Fig. 8 is a plan illustrating the yarn feeding fingers, the rubber yarn tension, a portion of the latch ring and part of the binder plate.

Fig. 9 is a partial section taken through line 9—9 of Fig. 8.

Fig. 10 is a fragmentary view from one side of the machine illustrating the cam control and a switch employed to stop and start a motor which functions only during the feeding of rubber yarn.

Fig. 11 is a section taken through the frame of the machine and illustrating those parts shown in Fig. 10 as they are seen when viewed from above.

Figs. 12 and 13 show the mercury switch in detail.

Fig. 17 shows the mercury switch and its controlling members as seen in Fig. 16, also another supply for the rubber yarn.

Fig. 18 illustrates a modified form of furnishing device which is to be employed on multi-feed machines, several of these being spaced about the machine and being driven from a common source of power.

Fig. 19 shows one of these units as seen from the outer end.

Fig. 20 is a section showing a portion of the furnishing device in detail;

Fig. 21 shows a further detail of what has been shown in Fig. 20.

Fig. 22 is a detail showing the yarn spacing comb used with each of these furnishing devices.

Fig. 23 illustrates the quick detachable means which holds each unit in place; and Fig. 24 shows a further modification of the furnishing device illustrated in the preferred form of the invention, this being the simplest effective means for drawing the rubber yarn from a supply and advancing it toward the needles under a minimum tension.

Figure 1:
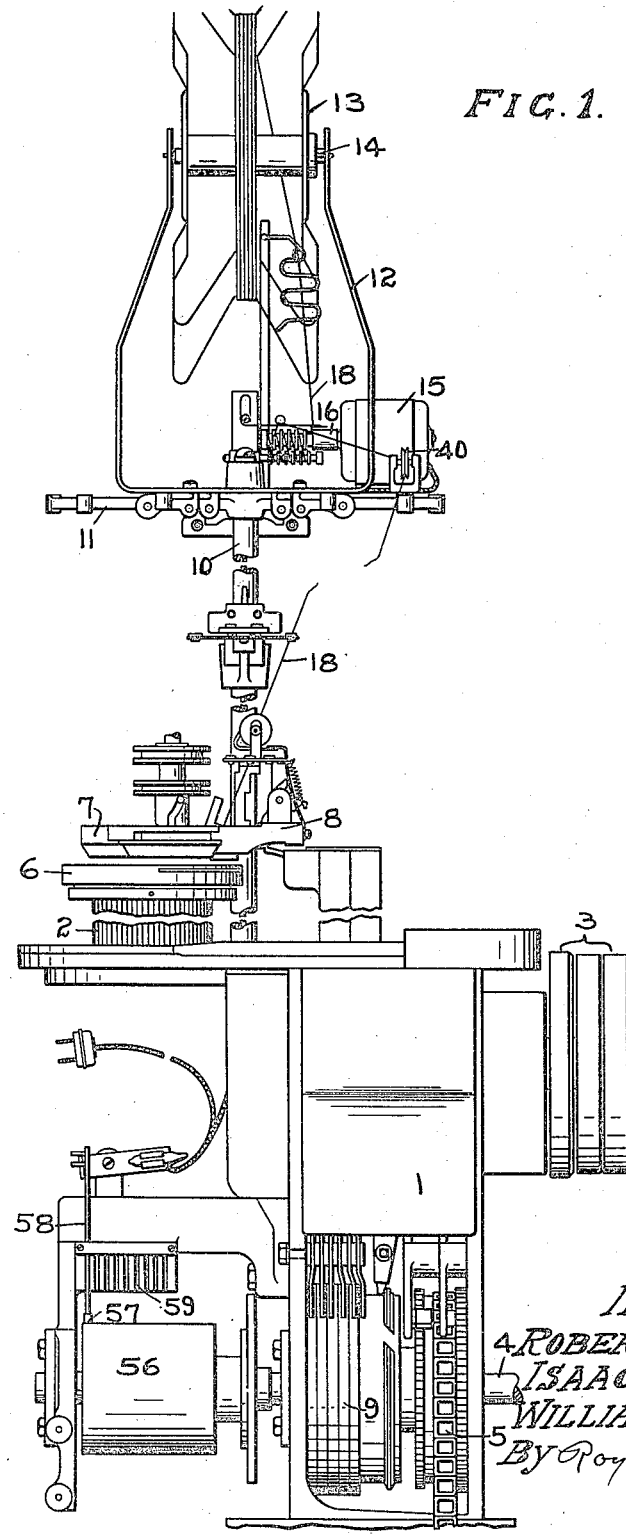
Fig. 1 is an elevation showing a preferred form of the invention as applied to a knitting machine, this machine being one adapted to knitting hosiery.
Figure 2:
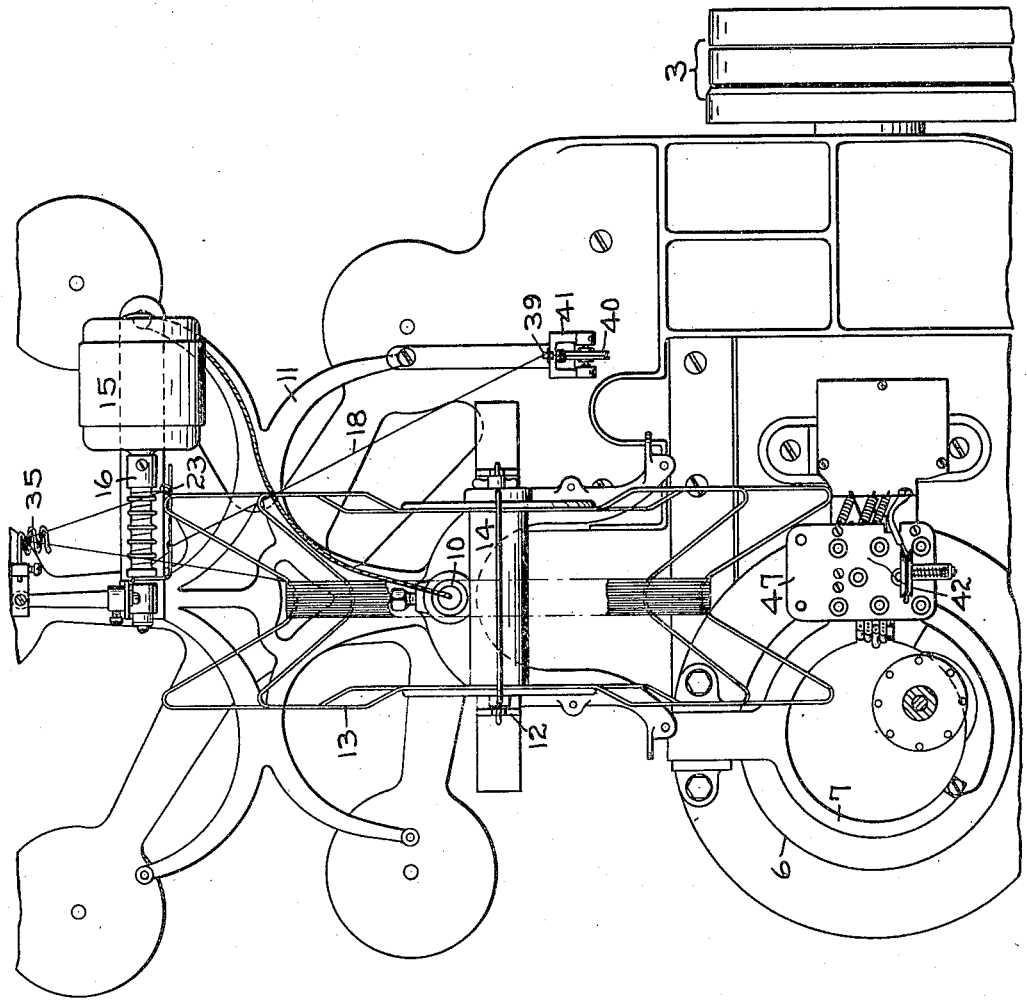
Fig. 2 is a plan showing the essential feeding elements and the supply which were shown at the top of Fig. 1.

As previously stated, the mechanism herein illustrated is particularly adapted to furnish rubber yarns to knitting machine needles, these rubber yarns being laid in or knitted into the fabric in manners well known in the art. The laying-in of the rubber yarn may occur throughout the consecutive courses or may be spaced lengthwise of the finished fabric in any suitable fashion. Likewise, if this rubber yarn is to be taken within the hooks of needles and actually drawn into knitted loops, it may be knitted in any combination of courses and/or wales. One preferred way of knitting the rubber yarns is to raise every fourth needle thus floating the yarn over those needles intervening and to bring this yarn in at about every fourth course. It has been found that such knitting introduces about the right amount of rubber into the fabric for making an elastic portion such as the stocking welt or garter. While the invention will be described relative to forming hosiery on machines such as illustrated, with the one exception of the modification shown in Figs. 18–22, it is to be understood that this description is only illustrative and we are not to limit the invention except as required by the prior art and limitations of the claims themselves.

Referring to Figs. 1–10, we will describe a preferred form of the invention wherein a hosiery machine has been illustrated having a frame 1, needle cylinder 2, driving pulleys 3, main cam shaft 4, and pattern chain 5. The usual sinker head 6, latch ring 7, yarn guides generally indicated at 8 and cams 9 on a drum on the main cam shaft are provided as is common in all such machines. The particular machine illustrated is a Banner wrap stripe machine having the usual control of needles for selectively raising the same to take wrap yarns. For purposes of illustration in the case, this selective control is employed to raise pre-determined needles for taking the rubber yarn. It is to be understood that any suitable selecting means may be used to bring up those needles which are to knit the rubber yarns and that the particular selection and mechanism employed therefor forms no essential part of the present case.

A post 10 projects upwardly from a portion of the machine frame and carries a support 11 at its upper end to which has been secured an upstanding, U-shaped bracket 12. A swift 13 of any suitable nature is mounted upon a spindle 14 capable of turning within bearings at the upper end of said bracket. This swift is preferably of a collapsible type so that skeins of rubber yarn may be easily stretched over the same to be loosely supported for drawing off as the rubber yarn is fed to the machine for incorporation into a fabric. It has been found that there are certain advantages in supplying the rubber, particularly uncovered rubber, from a swift since a circulation of air through the rubber prevents it from sticking thus allowing it to be drawn off more easily; and also we avoid winding the rubber onto a spool or cone thus saving considerable time and expense.

While it has not been shown in this case we may employ a brake or any other suitable means for retarding the rotation of swift 13 on its spindle to prevent over-running. On the support 11 we have mounted a yarn furnishing device consisting of a small electric motor 15, a roll or spindle 16 attached by means of set screw 17 to the shaft of the motor and about which the yarn to be fed, herein designated by numeral 18, has been wrapped several times. As illustrated in Fig. 4 this spindle 16 has a plurality of flanges 19 for the purpose of separating the convolutions of yarn passing about it. A wire guide 20 is adjustably fixed to the angular bracket 21 by means of a screw 22. This wire guide has eyes 23 and 24 for guiding the yarn onto and away from this yarn furnishing spindle. Referring to Figs. 4 and 6, a second spindle 25 is shown rotatable in the head portion 26 of an element which passes through bracket 21 to be held in that bracket by a collar 27 adjustably attached to the reduced end of head 26 by means of a set screw 28. Spindle 25 has a collar 29 bearing against one flattened side of head 26 and a sleeve 30 held to the other end of the bearing portion of this spindle by means of a washer 31 and a screw 32. This spindle 25 is freely rotatable within this bearing in the head 26 and further, said spindle may swing in a vertical plane from the full line position shown in this Fig. 4 to the dotted line position shown below. The set screw 28 strikes against an adjustable stop 33 fixed to that side of bracket 21 so that spindle 25 cannot be moved upwardly to strike the element 16. These elements 16 and 25 may be constructed of any suitable material such as pressed fibre or may be made of metal as long as the surfaces are reasonably smooth and the material has suitable resistance to wear. It will be noticed that spindle 25 has a number of flanges 34 to keep the yarn separated as it passes about the spindle, these flanges being staggered relative to flanges 19 for properly guiding the yarn. The manner in which the yarn passes through eye 23 and about elements 16 and 25, then through eye 24 to the machine is illustrated in the sectional view Fig. 7.

Under the control of a switch to be described later the motor 15 is to be started whenever the rubber yarn is to be fed and stopped whenever it is desired to discontinue knitting said rubber yarn. The furnishing roller or spindle 16 will rotate at a greater speed than the speed at which the yarn is demanded, the section of this furnishing device being similar to that of United States applications 14,492 and 56,363. This furnishing device will draw the rubber from the swift or other supply and will advance it to the needles of the machine under practically no tension since the harder the rubber sticks to the supply, the greater will be the force exerted to draw that rubber as it is more tightly snubbed about spindles 16 and 25.

The yarn 18 passes through a combination guide and tension 35, Figs. 3 and 5, which is fixed in the upper end of a post 36. This element 35 has an eye 37 through which the yarn is drawn and a grid 38 through which the yarn may be passed for tensioning. This helps to prevent over-running of the swift in case the yarn draws too freely. After the yarn passes from the furnishing device it is led through a guide 39 and over a small pulley 40 rotatable in a bracket 41, then downwardly to the needles of the machine where it may or may not be subjected to further tension.

Under normal conditions the spindle 25 will rotate in a dotted line position, Fig. 4. In the event that added resistance to drawing of the rubber yarn is encountered, the wrappings of said yarn about both spindles will temporarily tighten so that it (the yarn) will be snubbed and fed more effectively as long as the added resistance continues. It has been found that this tightness may be instantaneously transferred to the needle side of the furnishing device and for that reason, spindle 25 rotatable in element 26 can be lifted to the full line position shown which movement provided for relieving this instantaneous increase of tension of the needle side of the furnishing means. After the rubber yarn has been snubbed more tightly around both spindles there will be sufficient traction thereon to take care of whatever added resistance is offered at the supply; as soon as this resistance decreases the yarn will loosen up about the rotating spindle and the lower spindle will gradually move down to its normal position.

Referring to Figs. 1, 8 and 9, the yarn 18 is shown passing between a pair of tension discs 42 and 43, the disc 42 being pressed toward disc 43 by means of a spring 44 adjustable for tension on stud 45. For convenience stud 45 upon which the discs are loosely mounted is held at the upper end of an angular bracket 46 attached to the plate 47 fixed above the yarn guide levers on latch ring 7. A rubber yarn 18 is shown passing down through the porcelain eye 48 in plate 47 and through a suitable opening in the end of guide 49, this guide being one of a plurality which are used for feeding various yarns. This yarn guide 49 is pivoted at 50 and is held in feeding position by means of a leaf spring 51. Other guides are urged to active position by coil springs 52 attached to hooks 53 on the plate and hooked levers 54 projecting from the guides themselves.

When in the position shown in Fig. 9, that is, when the cam control has allowed spring 51 to move guide 49 into active position, the discs 42 and 43 are allowed to tension the rubber yarn just before it is taken by the needles. This is accomplished by means of a wire hook 55 forming an extension of spring 51 and projecting between the flanged edges of said discs. In normal operation these discs are not pressed together with very much force so that the rubber has only a slight drag imposed thereon. However, just as soon as lever 49 is moved to an inoperative position at which time the rubber yarn will be taken into a yarn binder and will be cut, spring 51 will move the hook 55 between discs 42 and 43 to release all tension which they exert on the yarn passing between them. Upon resuming knitting rubber, this provides for allowing the needles to take the rubber yarn and knit a few loops drawing the yarn from the supply before pulling the cut end from the binder. It is to be understood that this rubber yarn is preferably introduced at the beginning of a garter or any other part of the stocking whereon it is to be incorporated and the yarn guide 49 will not move from position until that part of the stocking wherein the rubber is incorporated has been completed. The courses and wales in which the rubber yarn will be knitted are to be determined by selection of needles which selection may be brought about in any convenient and satisfactory manner.

Referring to Figs. 10–13 we have illustrated a preferred form of the invention wherein the switch control for starting and stopping motor 15 is shown. This control is preferably taken from drum 56 on main cam shaft 4, this drum having many cams thereon for controlling other functions of the machine, only one cam 57 used for stopping and starting motor 15 being illustrated in this case. A vertical rod 58 passes through one of several guides in a block 59 and is held to bear downwardly upon the surface of drum 56 (except at such times as it is raised up on cam 57) by a spring 60 fixed to a notch in the rod and to a pin 61 projecting from a fixed part of the machine. A mercury switch 62 of any satisfactory type is mounted on angular lever 63 pivoted at 64 on an upright post 65. A reduced end 66 of the forwardly projecting part of lever 63 passes between two pins 67 and 68 threaded or otherwise fixed within the upper end of rod 58. At the start of feeding rubber in any desired portion of the fabric cam 57 passes beneath 58 raising the same against the tension of spring 60 and at the same time rocking lever 63 about its pivot. Mercury switch 62 which had previously been in a position to prevent current flowing through to motor 15, will move to such a position that current will be supplied to the motor. The length of cam 57 depends upon the extent through which it is necessary to feed rubber yarn to the fabric and at the termination of such feeding, rod 58 will drop from cam 57 returning mercury switch 62 to its original position thus stopping the motor and discontinuing the furnishing of the rubber yarn.

It is to be understood that as many cams may be placed about drum 56 as are necessary depending upon the number of rubber insertions introduced into any single fabric. While the rubber may not be fed to each course throughout any area in which it is incorporated, the action of the furnishing means herein illustrated being similar to that of the United States applications above mentioned will provide for feeding as much and only as much rubber as is needed. It is only necessary to stop and start the furnishing device at the beginning and end of any particular part of the fabric wherein rubber is to be incorporated.

Figure 14:
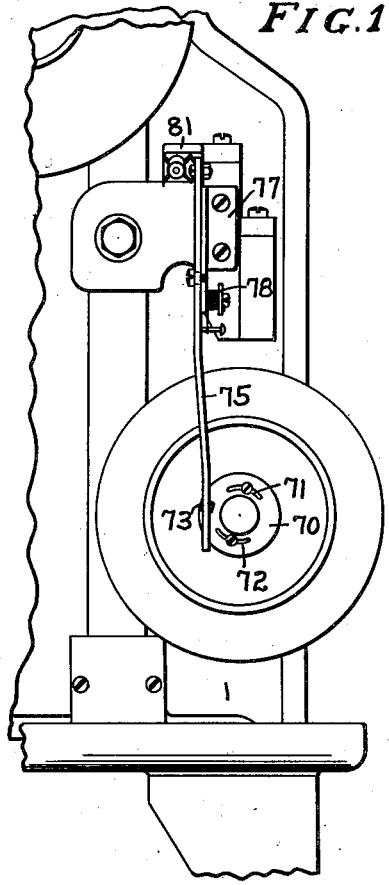
Figs. 14 and 15 are elevations showing a modified form of the invention for controlling the motor which drives the furnishing device.
Figure 15:
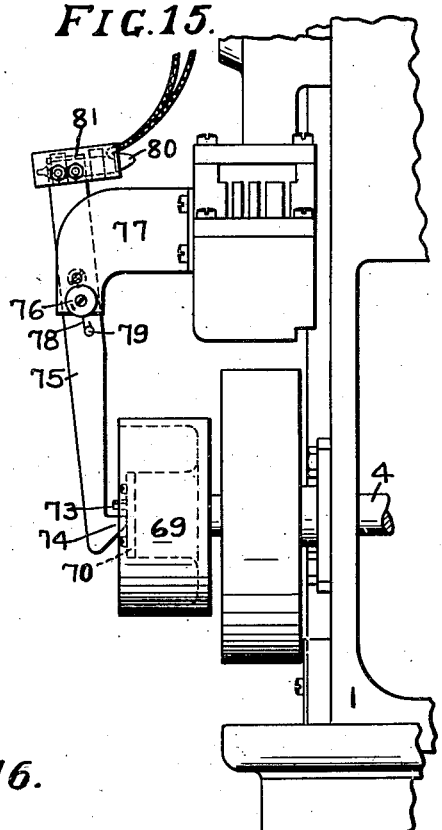

Referring to Figs. 14 and 15, another switch control for the motor 15 has been illustrated. In this particular control the cam shaft 4 has been extended to support a drum 69, the drum being used for purposes not illustrated or described in this case since they form no particular part thereof. The hub of drum 69 as a plate 70 attached thereto by means of suitable screws passing through elongated slots 71 and 72 for the purpose of allowing a certain amount of adjustment of the plate. This plate has a cam 73 which functions upon a follower portion 74 of a lever 75. Lever 75 pivots about point 76 on a bracket 77 attached to a fixed part of the machine, this pivot also including a spring 78 which attaches to a pin 79 secured in the lever and to the support in such a manner that the follower or toe portion 74 of the lever always tends to bear inwardly against the plate except when pushed outwardly by the cam.

A mercury switch 80 very similar to that illustrated at 62, Figs. 12 and 13, has been attached to a support 81 on the upper end of lever 75. When the lever 75 is in the position shown in Fig. 15 switch 80 will not allow current to flow through to the motor, but when follower 74 rides up on cam 73, the mercury switch will be tilted and then will allow the motor to become active thus starting the feeding of the rubber or other yarn.

Figure 16:
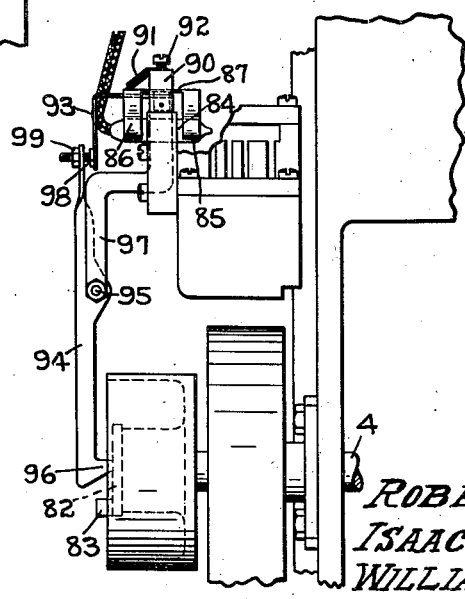
Fig. 16 is an elevation showing another form of the invention for accomplishing this same purpose.

Again referring to Figs. 16 and 17 another modified form of motor switch control is shown wherein a plate 82 having a cam 83 thereon is attached to the end of the hub on a drum on the main cam shaft 4 or on any other suitable rotating, timed element. A switch 84 similar to those previously described is supported as better illustrated in Fig. 17, by means of clips 85 and 86 projecting downwardly from element 87. Another angular portion 88 is fixed at the center part of element 87 to support the same and is free to rock on a pin 89 passing through bracket 90. This assembly is urged to incline or pivot in one direction by means of spring 91 attached to a projection 92 on the upper end of the bracket 90 and at the other end to element 87. An angular lever 93 will move the entire switch assembly to incline in the opposite direction whenever a lever 94 is rocked about its pivot 95 by means of cam 83. Lever 94 has a toe portion 96 which is contacted by cam 83, and the lever itself is pivoted on a bracket 97 projecting downwardly and secured to a rigid portion of the machine frame or extensions thereof. The upper end of lever 94 has threaded therein a stud or bolt 98 which is adjustable and capable of being locked in an adjusted position by means of lock nut 99. The head of this stud or bolt bears against the lower end of lever 93, and transmits the motion of lever 94 as influenced by cam 83 to the switch which controls the motor.

In each of the modifications described current may be obtained from any suitable source such as by plugging in a plug 100, Fig. 17, at any convenient outlet, the current passing through one of the mercury switches when the switch permits, and thence to the motor. The preferred form of the invention is based on the use of a mercury switch such as is commonly known, but it is clear that other switches such as those mechanically functioning might be employed and we are not to be limited to the particular sort of current controlling devices herein shown.

A simplified support is illustrated in Fig. 17 consisting of a downwardly projecting, U-shaped bracket 101 connected to the under side of the bobbin stand 102 or to any other suitable fixed portion of the machine. Within this bracket is pivoted for rotation a spool 103 having thereon a supply of rubber or other yarn which is to be intermittently fed to the knitting machine as hereinbefore described.

Another form of the furnishing device itself has been illustrated in Figs. 18–22, this particular modification being preferably employed in a multi-feed machine. A casing is comprised of a base 104, an annular part 105 and a cover 106. Within this casing a ring or master gear 107 is positively rotated by means such as was thoroughly disclosed in United States application 14,492, filed in the names of Lawson and Smith.

A plurality of furnishing units, one only of which has been illustrated herein, will be arranged for rotation upon spindles 108 mounted in suitable bearings within portion 105 of the casing, each spindle 108 extending through to support a pinion 109 meshing with master gear 107, the bearings upon which spindle 108 rotates being enclosed within a sleeve 110 projecting from a flange-like element 111. Spindle 108 carries at its outer projecting end a yarn engaging and furnishing element composed of a plurality of wires 112 spaced and clamped by means of discs 113 and 114. The yarn passes thru guide 113' prior to engaging the feeding roll and thru guide 114' upon being finally led from the unit. A series of yarn separating and guiding plates 115 have been fixed along the wires 112.

Flange element 111 extends at an angle and downwardly to support a bracket or extension 116 which carries at the lower end thereof a boss 117, Fig. 20. This boss is drilled at 118 to receive a portion 119 of a ball and socket. A set screw 120 secures this element 119 in position. A spindle or roller 121 having a series of flanges 122 for separating the yarn passing thereabout and a socket portion 123 is rotatable upon element 119 as shown. The outer end of spindle 121 is enlarged to form a brake portion 124 and is then greatly reduced to the bearing portion 125. This reduced end 125 fits within a slot 126 in the angular element 127 which has been attached by riveting or other suitable means to extension 116. This angular element 127 extends downwardly at 128 and carries a felt pad 129 for the purpose of acting as a brake against the surface of enlarged portion 124 of spindle 121 to retard rotation of the same. It may be seen that spindle 121 is rotatable upon its ball and socket bearing and when in the position shown in Fig. 18, will be rotated against the retarding influence of pad 129, however, when moved away from the brake element, will rotate freely on its bearings.

As shown in Figs. 18, 19 and 22, a comb 130 has been attached to extension 116 for the purpose of positively separating and spacing the yarn as it passes from the furnishing roller to spindle 121 and back. A wire element 131 is pivoted at the upper end 132 at one side of the comb and when in the position shown in Fig. 22 wherein the free end snaps into a slot 133, this wire will serve to lock the yarn between the comb teeth. For threading up the device this wire element may be swung to one side as indicated in the dotted line position, Fig. 22.

Flange element 111 projects downwardly as before mentioned and this downwardly projecting part is beveled as indicated in Figs. 18 and 23 to engage between the opposed and inwardly projecting sides of a clip 134. Sleeve 110 is a sliding fit in the opening provided therefor in casing 105 and each entire assembly as illustrated in Fig. 18 may be quickly detached or inserted and snapped into a locked position by the operator. When snapped into position as illustrated the clip 134 will hold each assembly in operating position until such time as it is desired to remove the same.

In operation this furnishing device has a yarn which it is to feed, this yarn being of any material or of any nature desired, wrapped about the furnishing wheel or roll and about the spindle 121 as indicated in Figs. 18 and 19. Depending upon the material and the degree of positiveness with which it is to be fed, the operator may put a few or many turns of yarn about these instrumentalities. The furnishing rolls may be of the type shown or may have an unbroken surface such as illustrated in some of the applications above mentioned. During normal operation the roll will be rotated at a speed to furnish the yarn at a faster rate than it will be demanded. According to the resistance at the supply or at any other point between the supply and the knitting instruments, this yarn will snub more tightly about the furnishing element to be fed more positively. As before stated there is a slight tendency for any increased resistance or tension between the supply and the furnishing device to be temporarily transmitted through to the other side of the furnishing means thus affecting the fabric knitted. In the device herein described such increase in tension will momentarily move spindle 121 which has been in the position indicated in Fig. 18 wherein the yarn wrapped thereabout will not rotate the spindle or else will rotate it very slowly due to the drag imposed upon the same by means of the brake 129. Just as soon as the increased tension moves spindle 121 away from its brake 129, that spindle will be free to rotate with no other resistance applied thereto than the friction of its bearings, thus decreasing the amount of drag or resistance offered to the yarn between the furnishing device and knitting instruments. The result of such action will be to neutralize the momentary tendency to increase tension at this locality by actually removing drag on the yarn which was imposed thereon before such momentary increase was effected. Briefly, the yarn will be fed under normal conditions by being drawn from the supply and advanced with a force equal to the tractive effort imposed by the furnishing roll minus the drag imposed by the spindle; as soon as there is a momentary increase in tension on the delivery side of the furnishing device, the drag of the spindle is removed thus allowing the yarn to be fed with the full effort which it is possible for the furnishing element itself to exert.

In Fig. 24 a further modification of the first form of the invention has been illustrated wherein a roller or spindle 135 having a roughened surface as illustrated is fixed to the shaft of a small motor 15' similar to that shown in Figs. 1 and 3. This motor will be controlled by any one of the switches herein illustrated, or by any other suitable switch and this simple device might be employed to draw any rubber or other yarn from its source of supply to feed the same at a somewhat uniform and minimum tension.

While the modification of the device as shown in Fig. 4 has been described as useful with a hosiery machine, its use is not limited thereto; likewise, the form of the invention shown in Figs. 18-22 is not necessarily limited to use with multi-feed machines but may be used with any knitting machine, being driven by a source of power such as the electrical motor of the first form or by any other connection to a driven part of the machine itself. It is quite within the scope of the invention to employ driving connections from the machine itself and to use a clutch or similar means for disengaging the drive and engaging the same, this clutch being automatically operated in any suitable way.

The invention has been described with reference to certain specific forms of the same and in more or less specific terms, but these are to be taken as illustrative only and we are not to be limited except by the claims themselves.

We claim:

1. In a knitting machine of the type described, the combination of a supply of knitting yarn, instrumentalities for knitting said yarn into a fabric, yarn furnishing means interposed between said supply and instrumentalities for drawing yarn from the supply and advancing it to the instrumentalities at a rate in accordance with the amounts of said yarn demanded by the instrumentalities, an electrical motor for driving said furnishing means and a switch operable at intervals to stop and start said motor for regulating the amount of yarn drawn and fed by the furnishing means.

2. Yarn furnishing means for knitting machines of the type described including a positively driven furnishing roll about which the yarn is to be wrapped for being frictionally advanced thereby, guide means on said roll for keeping the separate wrappings of yarn spaced, a rotating element beneath said first mentioned roll and about which the yarn is wrapped, guiding means associated with this rotating element for keeping the yarn spaced as it passes thereabout and a pivot within which said rotating element may turn and upon which it may swing to and from the first mentioned roll.

3. In a knitting machine of the type described, a supply of knitting yarn and instrumentalities for knitting the same into a fabric, yarn furnishing means interposed between said supply and instrumentalities for advancing the yarn towards the latter and a motor for driving said furnishing means, a switch for stopping and starting said motor and pattern controlled means for operating said switch at predetermined intervals.

4. In a knitting machine of the type described, the combination of a supply of knitting yarn, instrumentalities for knitting said yarn into a fabric, yarn furnishing means interposed between said supply and instrumentalities, an electric motor for driving said furnishing means, a mercury switch for controlling said motor, said mercury switch being mounted for rocking about a pivot and pattern controlled means for rocking said switch at predetermined intervals.

5. In a knitting machine of the type described, the combination of a supply of knitting yarn, instrumentalities for knitting said yarn into a fabric, yarn furnishing means interposed between said supply and instrumentalities for advancing said yarn to the instrumentalities as demanded by them, an electric motor for driving the furnishing means and a mercury switch for stopping and starting said motor, said switch being mounted at one end of a lever so that when the lever is rocked about a pivot the switch will operate to control the flow of current to the motor and cam means on the main cam shaft of the machine for causing said lever to rock about its pivot.

6. A yarn furnishing device for knitting machines including a positively driven spindle and means thereon for frictionally engaging a yarn wrapped thereabout to advance the same, means for separating and spacing said yarn as it is wrapped thereabout, another rotating element adjacent said advancing means about which said yarn is wrapped, this means normally functioning to exert a drag on the yarn passing thereabout but movable upon momentary increase in tension to release drag on the yarn for the purpose described.

7. A yarn furnishing device for knitting machines including a positively driven spindle, means on said spindle about which yarn is wrapped for advancing the same and other means for keeping said wrappings of yarn spaced from one another, a rotating element adjacent said spindle and about which the yarn is wrapped, this element having means for keeping the wrappings of yarn spaced, a pivotal bearing for one end of said element and a slot within which the other end is free to rotate and to move to and from the spindle, a brake functioning upon the end of said element opposite the pivotal bearing, this brake functioning only when said element is not drawn toward the spindle under the influence of the yarn wrapped thereabout.

8. A yarn furnishing device for knitting machines including a pair of rotating elements about which the yarn is wrapped, means on both elements for spacing and guiding the yarn, one element being positively driven to advance the yarn and the other element tending to be driven by the yarn, said element being movable to and from the first and a brake for retarding the rotation of said second element when normal tension exists in the yarn wrapped about both elements, but so constructed that the brake ceases to function as soon as tension exceeds a predetermined amount.

9. In a machine of the type described, a supply of knitting yarn, instrumentalities for knitting the yarn into a fabric and a yarn furnishing device for drawing yarn from the supply and advancing it to the instrumentalities, and means functioning with said furnishing device and rotated by the yarn for absorbing increase in tension on the yarn between said device and instrumentalities, said means and device being so constructed and positioned that when several convolutions of yarn are passed about each, the said yarn will feed without interference.

10. In a knitting machine of the type described, a supply of knitting yarn and instrumentalities for knitting this yarn into a fabric, a yarn furnishing device for drawing yarn from the supply and feeding it to the instrumentalities under substantially constant tension including in combination, means for absorbing momentary increases in tension on the yarn, said means being positioned adjacent the furnishing device and constructed so that a plurality of convolutions of yarn are passed about each element and fed without interference, said means being rotated by the yarn and movable to and from the furnishing device.

11. A yarn furnishing device for machines of the type described including a driven roll about which yarn is wrapped to be advanced frictionally.

means for driving the roll at a peripheral speed greater than the lineal speed at which the yarn is to be advanced, another rotating element adjacent said roll and about which the yarn is also wrapped, the construction and arrangement being such that several convolutions of the yarn may be passed about both roll and element and wherein the element is driven by the yarn.

12. In a multi-feed knitting machine the combination of a plurality of yarn supplies, instrumentalities for knitting said yarn into a fabric and a plurality of yarn furnishing devices, one of which is interposed between said supply and the instrumentalities, a common support within which the devices are to be inserted and quick detachable means for maintaining said devices in the support including a spring clip attached to one of the elements and a complementary portion on the other element for being inserted in the clip.

13. In a knitting machine a plurality of yarn furnishing devices and a common support therefor, quick detachable means for securing said devices to said support including a spring element and an element to be engaged by said spring element, the construction being such that when said spring element engages with the element to be engaged, the device will be held in position against all normal forces tending to displace the same, but may be deliberately withdrawn at will.

14. A yarn furnishing device for knitting machines including a positively rotated spindle, yarn engaging means thereon about which the yarn is wrapped and by means of which it is frictionally advanced, means for rotating said engaging means at a peripheral speed greater than the lineal speed at which said yarn is to be advanced, a second rotating element adjacent said spindle about which the yarn is also passed, a brake for said element, the construction being such that when in one position said brake will act upon the element, but when the element is moved under the influence of the yarn wrapped about it and the yarn engaging means on the spindle, it will be released from the retarding effect of the brake.

ROBERT H. LAWSON.
ISAAC H. C. GREEN.
WILLIAM L. SMITH, Jr.